UNITED STATES PATENT OFFICE.

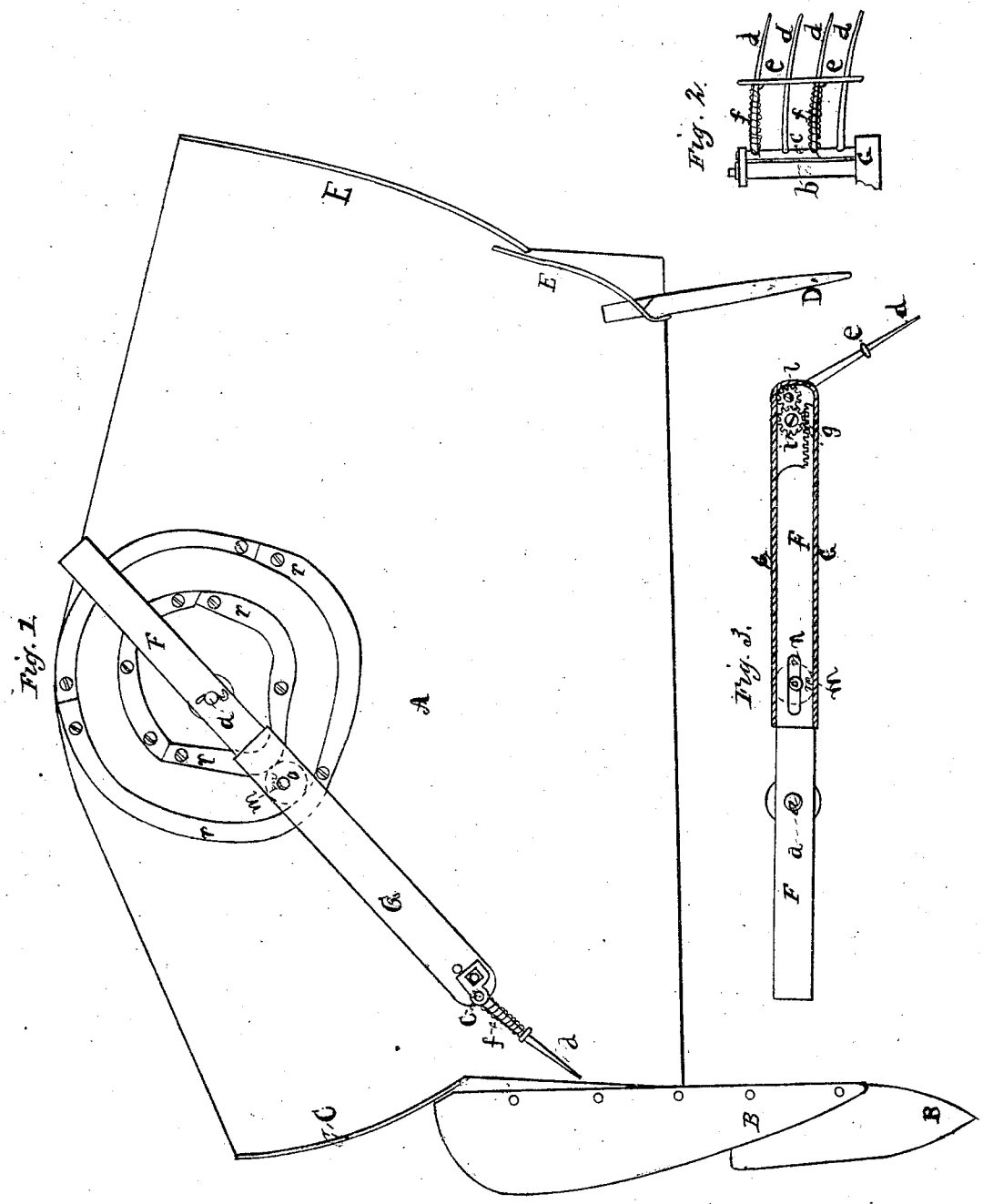

JACOB MILLER, OF CANTON, OHIO.

IMPROVEMENT IN HARVESTER-RAKES.

Specification forming part of Letters Patent No. 66,983, dated July 23, 1867.

*To all whom it may concern:*

Be it known that I, JACOB MILLER, of Canton, in the county of Stark and State of Ohio, have invented certain new and useful Improvements in Operating Rakes on Harvesting-Machines; and I do hereby declare the following to be a full, clear, and exact description of the construction and operation of the same, reference being had to the accompanying drawings, making a part of this specification, in which—

Figure 1 represents a top view of a platform or grain-table of a harvesting-machine, with the rake in question in position thereon. Fig. 2 represents the rake detached from its driving and moving arm, or from the grain-table. Fig. 3 represents a view of the under side of the driving-arm, and the gearing for moving the rake on the driving-arm.

Similar letters of reference, where they occur in the separate figures, denote like parts of the mechanism in all the drawings.

My invention consists in certain mechanism for turning the rake upon the driving-arm at the same time that it moves around with the driving-arm, said mechanism consisting of a rack or its equivalent and spur-gears or pinions.

To enable others skilled in the art to make and use my invention, I will proceed to describe the same with reference to the drawings.

A represents a grain table or platform, on which is the usual outside divider B, and fence or guard-board C in rear of it; an inside divider, D, and gaveling-board E in rear of it.

Upon the rear central portion of the grain-table there is a post, $a$, on and around which an arm, F, is moved by suitable gearing underneath the platform, operated from the main driving-wheels in a manner well known to mechanicians.

The arm F has slipped over or upon it a second arm, G, and upon an upright, $b$, on the extreme outer end of the arm G there is pivoted a fork or rake head, $c$, carrying the tines $d$.

A spring-guard, $e$, having suitable holes in it for receiving the tines of the rake, is slipped onto the tines, and held at about their centers in length by the springs $f$; but can yield against the springs when necessary, and very much strengthen the tines.

On the outer end of the arm F there is a rack, $g$, which works in a pinion, $i$, on the outer arm G, and this pinion $i$ gears into another pinion, $i'$, on the lower end of the rake or fork head, which latter passes through the outer arm G, so that the rack is on one arm and the pinions on the other one.

A pin or stud, $o$, is fastened to the outer arm, and projects down through a slot, $n$, in the inner arm, and has upon its lower end a friction-roller, $m$, which, as the arms are revolved, runs between the cam-ledges $r\ r$, and thus the outer arm G is projected or withdrawn to cause the rake or fork to traverse the front of the platform, and in close proximity to the guide and gaveling boards, while this projected and withdrawn motion causes the pinion $i$ to turn by rolling against the rack $g$, and in turning it also turns the pinion $i'$, which, being fast on the rake-head $c$, turns it and the rake-tines $d$, so that they shall properly enter the grain and sweep it around to the point of delivery, where it again turns, so as to leave the grain without entangling it. The rake or fork, in making an entire round on the arm G, makes a turn of about a half-circle or less on said arm, and thus it gets its proper position or inclination for entering, sweeping off, and delivering the cut grain.

Instead of a rack, $g$, a rod or link connection may be made between the arm and pinion $i$, which would turn this pinion sufficiently far to get the motion required for turning the rake through the other pinion, $i'$; but I prefer the rack as of more uniform motion, and capable of a greater extent of motion, than the rod or link.

The cam-ledges may be covered by a secondary or upper grain-table, between which and the lower one, or platform proper, the arm may move.

Besides strengthening the tines and allowing longer ones to be used, the guard or slide $e$ prevents the fork from cramping, as it moves the grain against the side board to form it into a compact bundle or gavel just previous to its delivery upon the ground.

Having thus fully described my invention, what I claim is—

1. In combination with a rake or fork for clearing the platform of a harvesting-machine, and revolved horizontally over said platform by an arm or arms driven from the main wheels, the cam and rack and pinion motions, for projecting and withdrawing said rake or fork, as well as for turning it on its arm, so that it may properly traverse the platform, enter, sweep around, and deliver the cut grain, substantially as described.

2. The spring-guard $e$ for strengthening the tines $d$, substantially as described.

JACOB MILLER.

Witnesses:
DANL. TONNER,
JOHN TONNER.